C. T. ALLCUTT.
ELECTRICAL MEASURING INSTRUMENT.
APPLICATION FILED DEC. 20, 1916.

1,289,068.

Patented Dec. 31, 1918.

WITNESSES:
Ed Plinke.
J H Procter

INVENTOR
Chester T. Allcutt.
BY
Wesley G Carr
ATTORNEY

UNITED STATES PATENT OFFICE.

CHESTER T. ALLCUTT, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,289,068.   Specification of Letters Patent.   Patented Dec. 31, 1918.

Application filed December 20, 1916.  Serial No. 138,035.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to high-voltage measuring instruments of the visible discharge or corona type.

The object of my invention is to provide a measuring instrument of the above indicated character that shall have means for indicating the position of the corona discharge on a tapered conductor and, consequently, the value of the voltage impressed thereon.

Heretofore, the ionization of the air by the presence of corona has been utilized for determining relatively high voltages. However, since the corona emanations are visible only in a dark room, it is desirable to provide a device of this character that may be used in any place.

In the carrying out of my invention, I provide means, such as an electroscope, for indicating when corona appears and a shield for the tapered conductor for so changing its relative diameter that the position of the shield, when corona appears, shall be an indication of the voltage.

Figure 1:
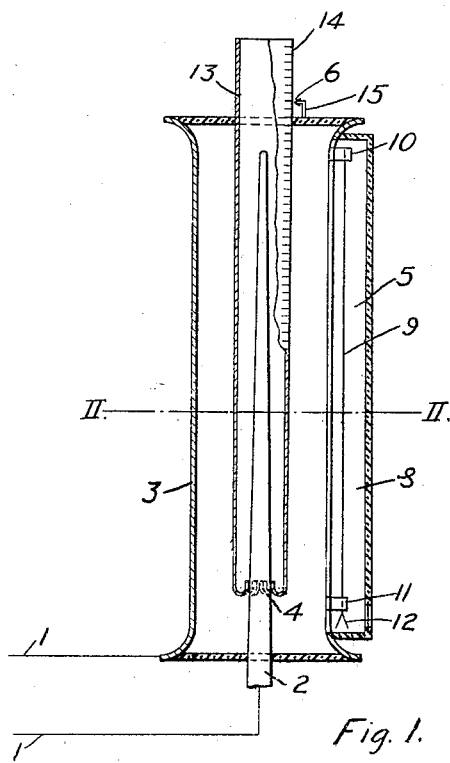
Figure 2:
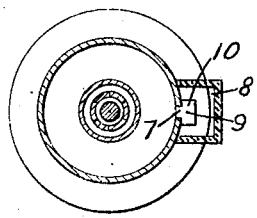

In the accompanying drawings, Figure 1 is a sectional view of a measuring device embodying my invention, and Fig. 2 is a view taken along the line II—II of Fig. 1.

A high-voltage electrical circuit 1, the voltage of which is to be determined, is operatively connected to a tapered conductor 2 and a cylindrical conductor 3 that is disposed concentrically with respect to the tapered conductor 2.

It is a well known fact that, for a given size of cylinder 3, the relation between the voltage applied between the cylinder and the conductor may be obtained from the following equation:

$$E = \frac{V}{r \log \frac{R}{r}},$$

where E is the surface intensity or electrical intensity at the surface of the tapered conductor 2, V is the voltage applied between the conductor 2 and the cylinder 3 and $r$ and R are the radii of the tapered conductor 2 and the inner wall of the outer cylindrical member 3, respectively. It will be seen that corona will appear at different points along the tapered conductor 2 according to its surface intensity and the radius of the same. That is, if the applied voltage is just sufficient to cause corona emanations from the tapered conductor 2 at the point 4, and the point 4 may be accurately determined, it is understood that an accurate means may be obtained for determining the value of the applied voltage. Thus, if some means, such as an electroscope 5, is provided for determining when corona appears and means 6 is provided for determining the point along the tapered conductor 2 at which it occurs, an accurate indication of the voltage impressed across the circuit 1 may be obtained.

The cylinder 3 is provided with an opening 7 along its length that communicates with an inclosed compartment 8 in which is disposed a conductor 9 that is insulated from the cylinder 3 by insulating members 10 and 11. Gold leaves 12 are secured to the conductor 9 at its lower end to thus constitute the electroscope 5. The electroscope is adapted to be initially charged from any suitable source of electromotive force (not shown). Thus, when the air within the cylinder 3 is rendered conducting because of its ionization, the leaves 12 will collapse to indicate the presence of corona around the conductor 2.

A conducting cylinder 13 is disposed about the tapered conductor 2 and is suitably electrically connected thereto at one end and movable longitudinally therealong for the purpose of so varying the relative radius and, consequently, the surface intensity of the tapered member 2 that the position at which corona occurs on the member 2 may be accurately determined. A scale 14 is marked on the member 13 and is adapted to coöperate with a pointer 15 to indicate the position of the member 13. The scale 14 may be calibrated in volts if it is so desired.

In the operation of the device, the movable member 13 is moved along the conductor 2 from its larger end until the gold leaves 12 indicate, by collapsing, that the air within the cylinder 3 has become ionized. When this condition obtains, the position of the member 13 will serve to indicate the position on the conductor 2 at which the corona occurs. Thus, if the radius of the conductor 2, at this point, is known and, consequently, its surface intensity for this point will be know, then, from the expression $$E = \frac{V}{r \log \frac{R}{r}},$$

the voltage may be accurately determined.

I do not limit my invention to any particular form of device for indicating the presence of corona or the position of the same, as my invention is applicable to various modifications without departing from the spirit and scope of the invention as set forth in the appended claims.

I claim as my invention:

1. A high-voltage measuring instrument comprising two concentric conductors, one of which is cylindrical and the other tapered, means for indicating the presence of corona surrounding the tapered conductor and a movable means engaging the tapered conductor for indicating, by its position, the position along the tapered conductor at which corona appears.

2. In a measuring device, the combination with a tapered conductor, a cylindrical conductor concentrically disposed with respect to the tapered conductor, and means for indicating the presence of corona around the tapered conductor, of a movable conducting means engaging the tapered conductor for indicating the position along the tapered conductor at which corona appears.

3. In a measuring device, the combination with a tapered conductor, a cylindrical conductor concentrically disposed with respect to the tapered conductor, and means for indicating the presence of corona around the tapered conductor, of a conductor concentric, and in engagement, with the tapered conductor for precluding the emanation of corona under predetermined conditions and for indicating the position on the tapered conductor at which corona appears.

4. A high-voltage measuring device comprising a tapered conductor, a main conducting cylinder concentric with respect to the tapered conductor and a cylindrical conductor surrounding the tapered conductor for indicating, by its position with respect to the tapered conductor, the difference in potential between the main cylinder and the tapered conductor.

5. In a measuring device, the combination with a tapered conductor, a cylindrical conductor concentrically disposed with respect to the tapered conductor, and means for indicating the presence of corona around the tapered conductor, of a conducting barrier for the tapered conductor having a scale thereon for indicating the position of corona discharge.

6. In a measuring device, the combination with a tapered conductor, a cylindrical conductor concentrically disposed with respect to the tapered conductor, and means for indicating the presence of corona around the tapered conductor, of a movable conducting barrier adapted to engage the tapered conductor and having a scale thereon for indicating the position of corona discharge.

7. In a voltage-measuring device for a high-voltage electric circuit, the combination with a tapered conductor connected to one conductor of the circuit, a conducting cylinder connected to the other conductor of the circuit and disposed concentrically with respect to the tapered conductor, and means for determining when corona is present around the tapered conductor, of means electrically connected to and relatively movable with respect to the tapered conductor for indicating the position of the corona discharge.

8. In a high-voltage measuring device, the combination with a tapered conductor, a conducting cylinder concentrically surrounding the same, and means for indicating when ionization is set up by the formation of corona around the tapered conductor, of a conducting member surrounding the tapered conductor for determining the position of the corona discharge.

In testimony whereof, I have hereunto subscribed my name this 15th day of Dec., 1916.

CHESTER T. ALLCUTT.